(12) United States Patent
Kimchi et al.

(10) Patent No.: US 10,114,875 B2
(45) Date of Patent: Oct. 30, 2018

(54) DASHBOARD CONTROLS TO MANIPULATE VISUAL DATA

(75) Inventors: Gur Kimchi, Bellevue, WA (US); Danyel Aharon Fisher, Seattle, WA (US); Brian L. Welcker, Seattle, WA (US); Jason J. Weber, Kirkland, WA (US); Ahmed K. Kamal, Bellevue, WA (US); Benjamin Edward Rampson, Redmond, WA (US); William Guthrie Morein, Cambridge, MA (US); Morten Holm-Peterson, Gentogte (DK); Bongshin Lee, Issaquah, WA (US); George G. Robertson, Seattle, WA (US); Christian Bernd Schormann, Seattle, WA (US); Barry James Givens, Redmond, WA (US); Joshua W. Lee, Redmond, WA (US); B. Scott Ruble, Bellevue, WA (US); Jakob Peter Nielsen, Redmond, WA (US); Michael V. Ehrenberg, Seattle, WA (US); Stella Yick Chan, Redmond, WA (US); Murali Krishnan, Bellevue, WA (US); Christian Olaf Abeln, Ödåkra (SE); Roland L. Fernandez, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1129 days.

(21) Appl. No.: 12/147,815

(22) Filed: Jun. 27, 2008

(65) Prior Publication Data
US 2009/0322782 A1 Dec. 31, 2009

(51) Int. Cl.
*G09G 5/00* (2006.01)
*G06F 17/30* (2006.01)
(Continued)

(52) U.S. Cl.
CPC .. *G06F 17/30554* (2013.01); *G06F 17/30557* (2013.01); *G06F 17/30566* (2013.01);
(Continued)

(58) Field of Classification Search
CPC ...... G06T 11/206; G06T 11/203; G06T 11/40; G06Q 30/02; G06Q 30/0201
(Continued)

(56) References Cited

U.S. PATENT DOCUMENTS 5,796,401 A * 8/1998 Winer ........................ 345/619
6,008,808 A 12/1999 Almeida et al.
(Continued)

OTHER PUBLICATIONS

Open Visualization Data Explorer, May 20, 2002 dx-4.2.0 released http://www.research.ibm.com/dx/. Last accessed Apr. 25, 2008, 3 pages.
(Continued)

*Primary Examiner* — Jin-Cheng Wang
(74) *Attorney, Agent, or Firm* — Drinker Biddle & Reath LLP

(57) ABSTRACT

A system (and corresponding methodology) by which a user can interact directly with visual data is provided. The system employs associations and relationships between visual data objects to automatically update objects based upon a change in other objects. The innovation also provides specialized controls (e.g., dashboard tools/controls) that facilitate manipulation of visual data. As there can be numerous manners in which a user can interact with visualization data, the innovation enables a specialized set of controls to be identified and provided to a user thereby reducing overwhelming effects of a large number of controls.

17 Claims, 12 Drawing Sheets

(51) Int. Cl.
*G06Q 30/02* (2012.01)
*G06T 11/20* (2006.01)
*G06T 11/40* (2006.01)

(52) U.S. Cl.
CPC ......... *G06Q 30/02* (2013.01); *G06Q 30/0201* (2013.01); *G06T 11/203* (2013.01); *G06T 11/206* (2013.01); *G06T 11/40* (2013.01)

(58) Field of Classification Search
USPC .................. 345/440, 765; 707/2–4; 705/1–7; 715/771, 810
See application file for complete search history.

(56) References Cited

U.S. PATENT DOCUMENTS

| | | | |
|---|---|---|---|
| 6,097,998 A * | 8/2000 | Lancki ............................ 701/33 |
| 6,529,900 B1 | 3/2003 | Patterson et al. |
| 7,518,611 B2 * | 4/2009 | Boyd et al. ..................... 345/473 |
| 7,836,403 B2 * | 11/2010 | Viswanathan et al. ....... 715/745 |
| 8,200,613 B1 * | 6/2012 | Wan .................. G06F 17/30566 707/601 |
| 2002/0118226 A1 * | 8/2002 | Hough et al. .................. 345/764 |
| 2003/0020739 A1 * | 1/2003 | Cohen et al. .................. 345/700 |
| 2003/0144868 A1 * | 7/2003 | MacIntyre et al. ............... 705/1 |
| 2004/0155903 A1 * | 8/2004 | Schneeberg .................. 345/765 |
| 2004/0225955 A1 | 11/2004 | Ly |
| 2005/0015377 A1 * | 1/2005 | Wan .................. G06F 17/30557 |
| 2005/0172226 A1 * | 8/2005 | Kobashi et al. .............. 715/518 |
| 2006/0095858 A1 | 5/2006 | Hao et al. |
| 2006/0112123 A1 | 5/2006 | Clark et al. |
| 2006/0136842 A1 * | 6/2006 | Charles ............. G06F 17/30557 715/825 |
| 2007/0043694 A1 | 2/2007 | Sawafta et al. |
| 2007/0061353 A1 * | 3/2007 | Bobbin ............... G06F 3/04842 |
| 2007/0061732 A1 * | 3/2007 | Bobbin ............... G06F 3/04817 715/739 |
| 2007/0101250 A1 | 5/2007 | Sumpf et al. |
| 2007/0130113 A1 * | 6/2007 | Ting .................................. 707/2 |
| 2007/0208725 A1 * | 9/2007 | Gilger et al. ...................... 707/4 |
| 2007/0250377 A1 * | 10/2007 | Hill et al. ........................ 705/11 |
| 2007/0279416 A1 * | 12/2007 | Cobb et al. .................... 345/440 |
| 2008/0066011 A1 * | 3/2008 | Urrabazo et al. ............. 715/810 |
| 2008/0086345 A1 * | 4/2008 | Wilson et al. ..................... 705/7 |
| 2008/0178148 A1 * | 7/2008 | Enyeart et al. ............... 717/109 |
| 2008/0195440 A1 * | 8/2008 | Bagchi et al. ..................... 705/7 |
| 2008/0209078 A1 * | 8/2008 | Bates et al. ..................... 710/10 |
| 2008/0288306 A1 * | 11/2008 | MacIntyre et al. ............... 705/7 |
| 2009/0002178 A1 * | 1/2009 | Guday et al. .............. 340/573.1 |
| 2009/0006112 A1 * | 1/2009 | White et al. ...................... 705/1 |
| 2009/0030759 A1 * | 1/2009 | Castelli ................ G06Q 10/063 705/7.25 |
| 2009/0031249 A1 * | 1/2009 | Castelli et al. ............... 715/810 |
| 2009/0157723 A1 * | 6/2009 | De Peuter ............. G06Q 10/10 |
| 2009/0172518 A1 * | 7/2009 | Ogievetsky ................... 715/234 |
| 2009/0217194 A1 * | 8/2009 | Martin et al. ................. 715/783 |
| 2009/0281845 A1 * | 11/2009 | Fukuda et al. .................... 705/7 |
| 2009/0319931 A1 * | 12/2009 | Hutchings et al. ........... 715/771 |

OTHER PUBLICATIONS

Elixir Dashboard Designer User Manual, Release 7.2, Published 2008. http://www.elixirtech.com/release/Rep7.2.1/pdf/Elixir%20Dashboard%20Designer.pdf. Last accessed Apr. 25, 2008, 42 pages.

Active Dashboards http://www.nouveau.co.uk/ActiveDashboards.php. Last accessed Apr. 25, 2008, 4 pages.

Munzner, et al. Constellation: A Visualization Tool for Linguistic Queries from MindNet. In: Proceedings of the 1999 IEEE Symposium on Information Visualization, Oct. 24-29, 1999, San Francisco, CA, USA http://graphics.stanford.edu/papers/const/const.pdf. Last accessed Apr. 25, 2008, 4 pages.

Shek. Enterprise Digital Dashboards as Rich Internet Applications http://www.csc.com/aboutus/leadingedgeforum/knowledgelibrary/uploads/Enterprise%20Digital%20Dashboards%20as%20RIAs.pdf. Last accessed Apr. 26, 2008, 71 pages.

* cited by examiner

DASHBOARD CONTROLS TO MANIPULATE VISUAL DATA

BACKGROUND

A computer dashboard or 'dashboard' generally, refers to a personalized desktop portal that enables a user to easily set preferences and policies with respect to display of and access to information and applications. A typical dashboard can display items of interest such as stock quotes, email message quotas, calendar entries/appointments, clocks, tasks, traffic information, access to favorite news feeds, etc. Oftentimes 'widgets' are used to display the personalized items upon a dashboard.

In computer programming, a widget (or control) refers to an element of a graphical user interface (GUI) that facilitates display of an information arrangement customizable or changeable by the user. One defining characteristic of a widget is the ability to provide a single specialized GUI for direct manipulation of or access to a given type of data (e.g., email, calendar, weather). Widgets are often described as basic visual building blocks which, when combined in an application, hold the data processed by an application and the available interactions related to the specific data.

Essentially, in information technology, a 'dashboard' is often described as a GUI that, somewhat resembling an automobile's dashboard, organizes and presents information in a manner that is easy to interpret. However, unlike an automobile's dashboard, a computer-based dashboard is more likely to be interactive and thus easily tailored to a user's preferences. In other words, users are able to integrate personalized information upon their dashboard for easy access.

Today, some computer products that attempt to integrate information from multiple components into a unified display often refer to their displays as 'dashboards.' For example, a product that obtains information from the local operating system in a computer, from one or more resident or remote applications, and from one or more remote sites via the Internet may present the collaborated information as though it originates from a single source. As described above, this is often referred to as a 'dashboard' view of the data.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a mechanism by which a user can interact with visual data. Essentially, the innovation provides specialized dashboard-like controls that facilitate manipulation of visual data. As there can be numerous manners in which a user can interact with visualization data, presenting the user with all the various controls available can be both distracting and overwhelming for many users. This innovation provides "change points" or "hot points" in the data that can be monitored and manipulated, by a dashboard-like mechanism, thereby enhancing the user-friendliness of the interaction tools.

In an aspect, visualization can be provided to illustrate how a change to one data element will influence other data elements. For example, a user can hover a mouse or pointer over a data element to ask the question, "If I change this, what else will change?" Additionally or alternatively, hovering over a data element can provide an indication of what elements, if changed, will have an impact on the selected data element.

In still other aspects, tools utilized to navigate the dashboard and manipulate the desired content from the data can also be personalized and provided. In an aspect, the dashboard can include the most important or most widely used controls while allowing lesser known controls to be available if a user desires to utilize those controls. Consolidation or aggregation of controls can be effected manually or automatically, for example, based upon explicit selection or implicit inference.

In yet another aspect thereof, an artificial intelligence (or machine learning & reasoning) component can be provided that employs a probabilistic and/or statistical-based analysis to prognose or infer an action that a user desires to be automatically performed.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
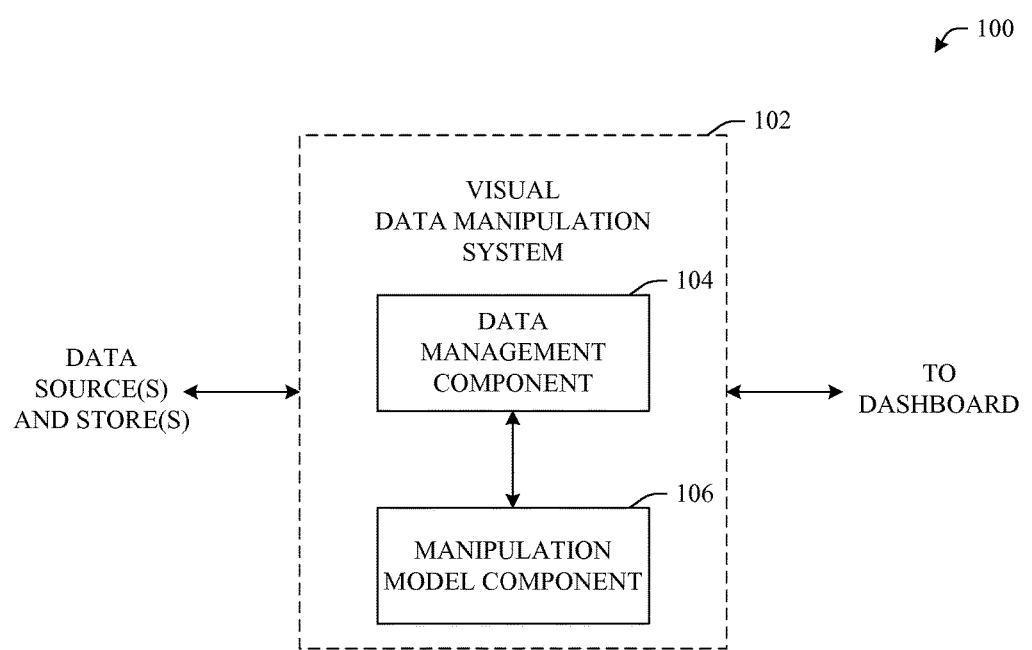
FIG. 1 illustrates an example block diagram of a system that enables a user to comprehensively and intelligently manipulate visual data upon a display.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

The innovation as disclosed and claimed herein discloses a visual data manipulation system that can present a user with a comprehensive set of controls based upon most any criteria including but, not limited to, data type, application type, inference, preference, policy or the like. As will be understood, there can be numerous manners in which a user can interact with visualization data however, presenting the user with all the various controls available can be both distracting and overwhelming for many users.

In an aspect, the innovation can provide "change points" or "hot points" in the data that can be monitored and manipulated, e.g., by a dashboard-type display or some other suitable mechanism. Thus, in aspects, visualization can be provided to illustrate how a change to one data element will influence other data elements. For example, a user can hover a mouse, pointer, or other navigation device over a data element to ask the question, "If I change this, what else will change? In response, the system can identify which data elements will change and, in embodiments, how and in what ways the change will occur. It is to be understood that other mechanisms such as, but not limited to, gestures, speech, or the like can be employed to select objects or areas within the visual representation. These alternative aspects are to be included within the scope of the innovation and claims appended hereto.

Additionally or alternatively, hovering over a data element can provide an indication of what elements, if changed, will have an impact on the selected data element. A comprehensive set of tools utilized to navigate the dashboard and manipulate the desired content from the data can also be provided. In other words, the dashboard can include the most appropriate or widely used controls while allowing lesser known controls to be available if a user desires to utilize those controls. These and other features, functions and benefits of the innovation will be described upon a review of the figures that follow.

Referring initially to the drawings, FIG. 1 illustrates system 100 having a visual data manipulation system 102 that enables a user to comprehensively and intelligently manipulate visual data upon a display. While many examples described herein are directed to data manipulation upon a desktop or personal computer (PC), it is to be understood that the innovation can be employed upon most any device capable of rendering visual data, for example, personal digital assistants, smartphones, cell phones, pocket computers, laptop computers, notebook computers, or the like. Additionally, while specific examples of implementations of the technology are shown below, it is to be understood that countless examples exist that that employ the features, functions and benefits of the innovation and are to be included within the scope of this disclosure and claims appended hereto.

One example implementation of the visual data manipulation system 102 is related to business workflow modeling. In one particular example, the innovation can be employed to illustrate effect(s) upon a global sales and product distribution workflow as a function of a change in a characteristic or parameter. For example, a visual rendering can be provided of sales workflow, e.g., including customers, sales force, factories, and distribution channels. In accordance with the innovation, a user can hover upon (or otherwise select) an object in a display thereby triggering an indication of which other objects upon the display will be affected by a modification to the originally selected object. This and other examples will be better understood upon a review of the figures that follow.

Referring again to FIG. 1, generally, system 100 can include a visual data manipulation component 102 that can access data from a variety of sources and/or stores and thereafter display the information upon a dashboard in accordance with a model. As shown, manipulation component 102 can include a data management component 104 and a manipulation model component 106 that together enable a user to selectively modify objects upon a visual rendering thereby automatically adjusting other objects within the rendering.

In operation, the data management component 104 enables a model (e.g., manipulation model component 106)

to be established by which objects (e.g., visual data) can be modified and updated based upon a change made to an associated object within a visual rendering. In other words, the manipulation model component 106 can include rules and other relationships by which objects can be updated. The rules and relationships define how and to what extent the objects should be updated and/or modified as a function of an original object.

In addition to defining how and to what extent objects should be updated and/or modified, the manipulation model component 106 also enables a set of tools or dashboard controls to be displayed which facilitate efficient and comprehensive manipulation of visual data. Here, the data management component 104 can be employed to automatically establish rules and/or parameters by which controls can be selected based upon most any factor including but, not limited to, data type, device, context, user identity, theme, etc. Additionally, the data management component 104 enables manual control selection based upon a user preference or policy. In either instance, the manipulation model component 106 can be employed to define the set of controls for a particular rendering, type of rendering, theme of rendering, etc.

For example, a set of controls for manipulation of a global sales workflow may be different from that of an election district rendering. For instance, the global sales workflow may include tools that enable product selection, distribution channel creation/deletion, etc. On the other hand, an election district rendering may include tools by which a user can select and drag a boundary to increase or decrease a region, thereby automatically manipulating the visual data rendering based upon a model (e.g., 106). While specific examples are described, it is to be understood that these examples are included to add perspective to the innovation and are not intended to limit the innovation in any manner.

Figure 2:
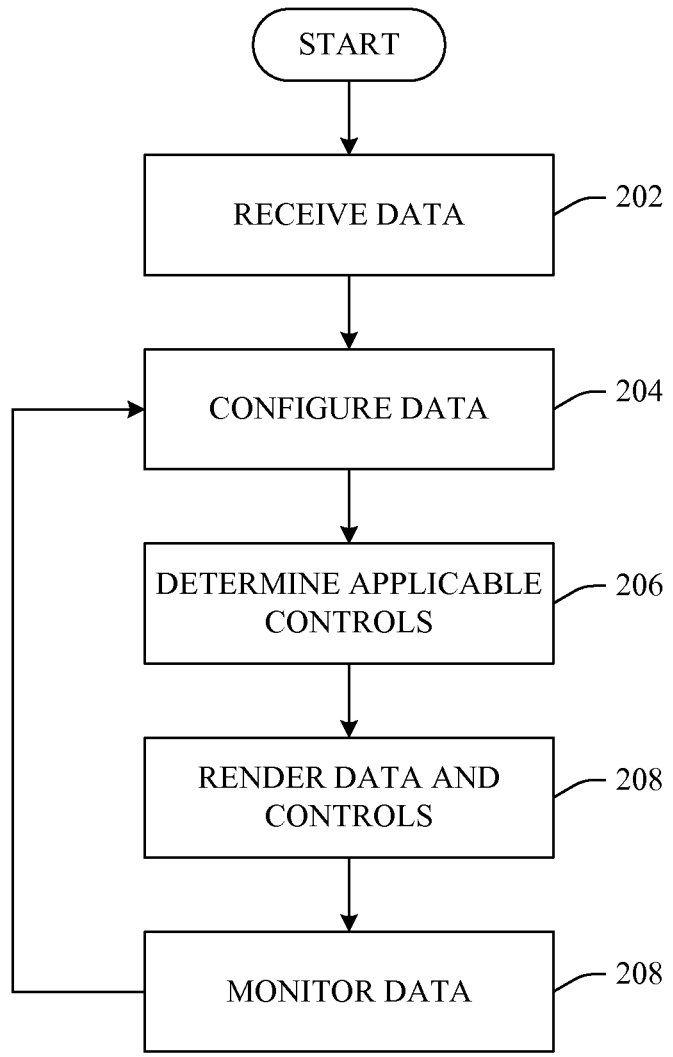
FIG. 2 illustrates an example flow chart of procedures that facilitate presenting dashboard controls in accordance with an aspect of the innovation.

FIG. 2 illustrates a methodology of presenting dashboard controls to facilitate manipulation of visual data in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, data is received, for example, data that represents a global sales workflow is received. The data is configured for rendering at 204. Here, it is to be understood that display device criteria can be considered when configuring the data for presentation. By way of example, display criteria can be employed to configure data for display upon a PDA or smartphone. It will be understood that rendering upon a PDA or smartphone can require graphics resizing, among other modifications to efficiently utilize limited screen real estate as well as processing and memory availability.

Applicable or appropriate controls can be determined at 206. Here, applicable modification controls can be identified based upon most any factor, including but, not limited to, data type, theme, display device, context, user identity, etc. The data with applicable controls can be displayed at 208. Essentially, the methodology of FIG. 2 describes a flow of rendering a set of applicable controls that can be used modify visual data. For instance, the controls can include object selection mechanisms, object resizing mechanisms, object generation/modification or deletion mechanisms, or the like.

As described above, users can interact with visual data in virtually countless ways. As it can be overwhelming to present a user with all controls possible to manipulate visual data, the methodology of FIG. 2 describes a high-level methodology whereby a focused set of controls can be provided to the user based upon factors such as data type, device context, user context, user identity or the like.

Continuing with the aforementioned example of a sales network rendering, the rendered data can be displayed in the form of individual components. For instance, customers, salesperson, factories, distributors, etc. can be displayed as individual components of the overall network. In other aspects, salespersons and corresponding geographic sales territory/responsibility can be displayed with corresponding sales forecast revenue and historical volume. In this example, controls can be provided that enable a user to click/drag a sales boundary to increase and/or decrease the size of a region.

In response to the resizing of a region, the visual data can automatically modify other aspects of the visual data which are affected by the modification of a disparate aspect. For instance, a salesperson's sales forecast or volume can be modified by an expansion or contraction of a particular geographic region. Essentially, the innovation can enable modeling, e.g., problem modeling, of data using graphical controls rather than requiring a user to explicitly enter data to 'solve' equations as conventionally employed by many conventional applications (e.g., spreadsheet applications).

In other words, in accordance with this example aspect, data maintained in a database or spreadsheet can be graphically displayed and manipulated via a visual rendering thereby dynamically adjusting to a change in data. As described above, rather than requiring a user to enter data into the database or spreadsheet to manipulate the data, the innovation enables users to employ controls by which data can be graphically manipulated (e.g., modify geographic area of a sales territory). As a result, other objects can be automatically updated to reflect the change. In this example, increasing the size of a sales territory may identify a need for additional salespeople, distributors, etc. to service the expanded size of the region.

As will be understood, the examples of the features, functions and benefits of the innovation are countless. Essentially, the innovation can be employed upon most any data having multiple pivots or dimensions. Another example of the innovation would be in relation to voting districts and redistricting of the same. As will be understood, modification of (e.g., consolidation, reduction, expansion) districts would most likely affect support to a candidate or issue on a ballot.

In addition to dynamically altering objects based upon a change or modification, the innovation also enables regression and causation analysis to be conveyed to a user prior to modification. In one example, a user can use a mouse, pointer or other navigation (or selection) device to identify, e.g., hover above an object. Accordingly, the innovation can reveal affect(s) upon other objects based upon the selected object. Effectively, the innovation can reveal which objects will be affected by a modification to a selected object. Additionally, the innovation can convey the extent that a modification of an object can have on other objects. Accordingly, the innovation can be employed to identify which objects control or otherwise affect a particular object. As will be understood, the knowledge conveyed by the innovation can be valuable in increasing the efficiency of visual data manipulation.

Figure 3:
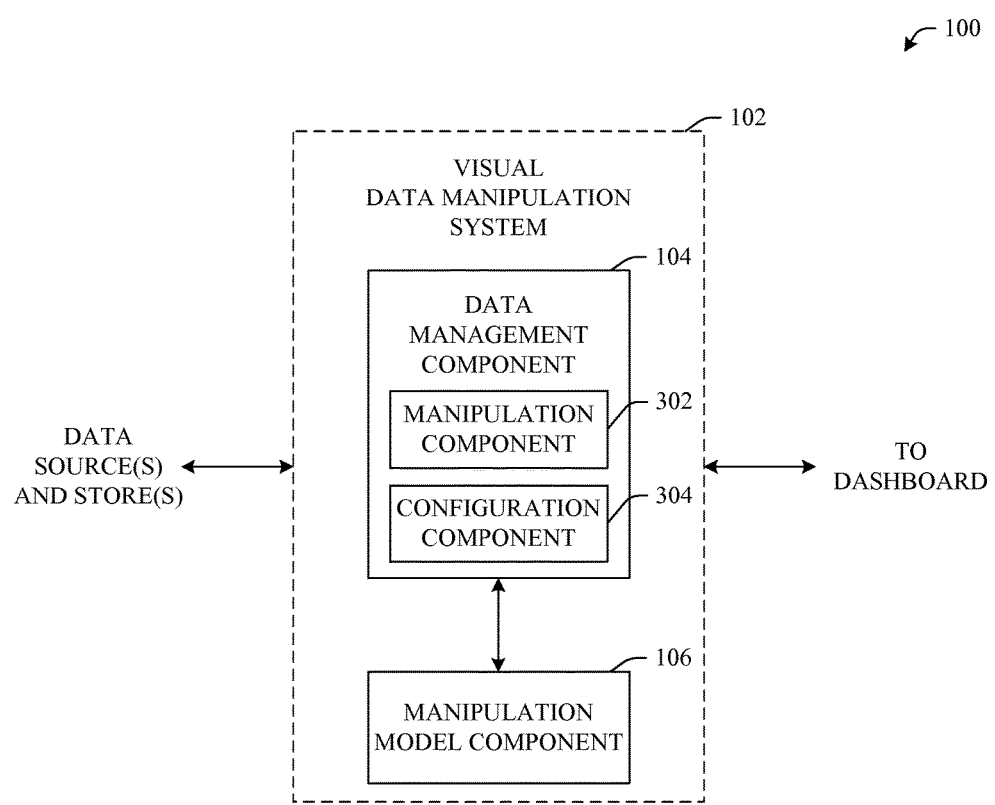
FIG. 3 illustrates an example block diagram of a system that triggers object relationships by way of visual data manipulation.

Referring now to FIG. 3, an example alternative block diagram of system 100 is shown. Generally, the data management component 102 can include a manipulation component 302 and a configuration component 304. Together, these subcomponents (302, 304) facilitate automatic readjustment of visual objects based upon a modification of a single object. As a feature of the innovation, the manipulation component 302 allows a user to modify visual data using on-screen tools or controls.

As shown, the visual data manipulation system 102 enables data and information to be gathered from a variety of local and/or remote sources and stores. This information can be configured by way of the configuration component 304 for display upon a dashboard as indicated. As described above, the configuration component 304 can arrange data based upon most any factor including, but not limited to, data type, device context, user context, user identity, etc.

Once arranged and rendered, the manipulation component 302 can provide access to tools and controls to modify or otherwise manipulate the rendering. In operation, the manipulation component 302 can identify associations and relationships between visually rendered objects such that the rendering becomes interactive. In other words, when one object is selected or modified, the manipulation component 302 together with the configuration component 304 can dynamically adjust appropriate objects to compensate for or take into account the change(s). Additionally, the manipulation component 302 can perform a pre-modification analysis to identify a set or subset of objects that will be affected by a modification of a particular object or group of objects.

Still further, the manipulation component 302 enables generation of the manipulation model component 106. As described herein, the model component 106 defines associations and relationships between data, disparate objects or groups of objects. Thus, upon a selection or modification, the model component 106 can define (e.g., based upon rules) which objects will (or should) be affected as well as the magnitude of the modification.

Figure 4:
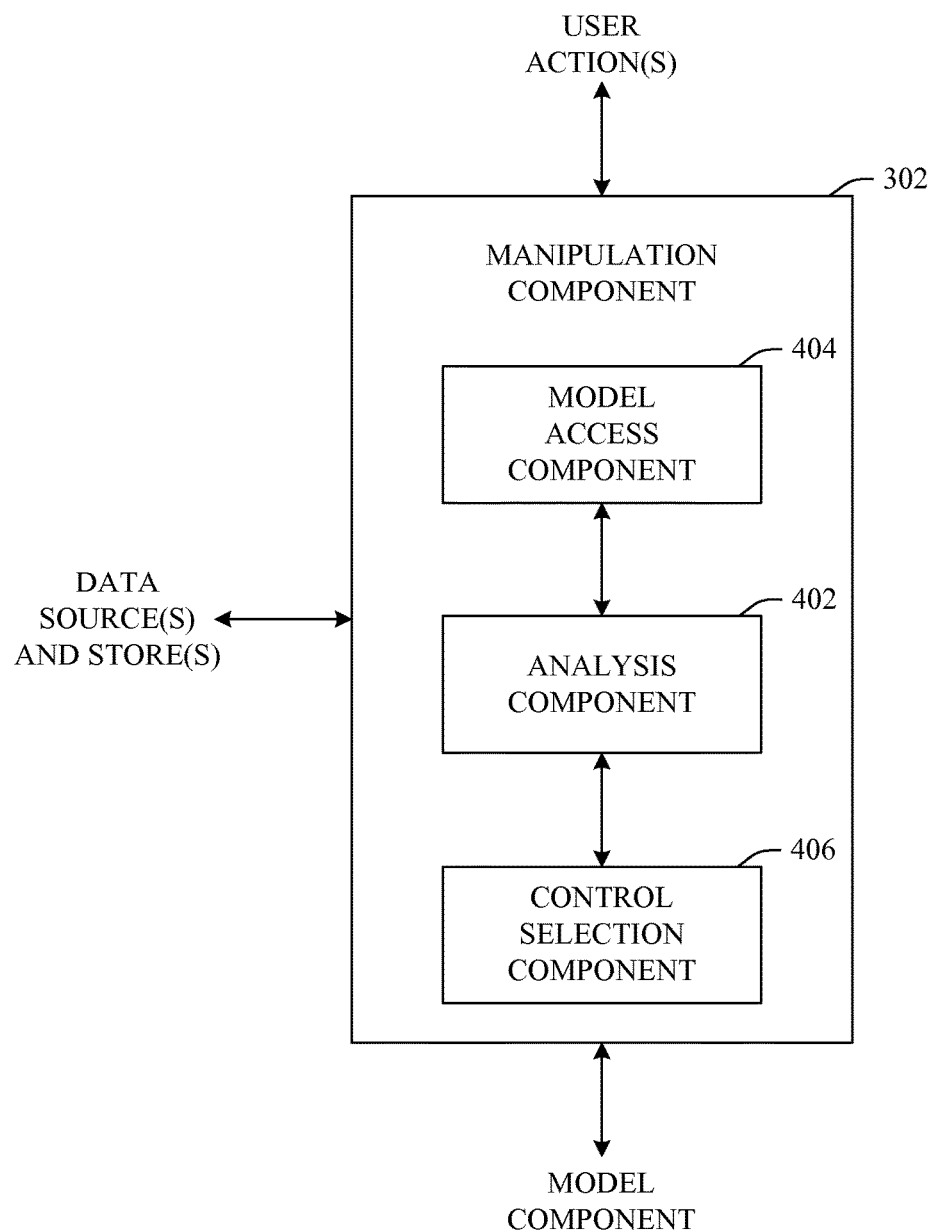
FIG. 4 illustrates an example block diagram of a manipulation component in accordance with an aspect of the innovation.

FIG. 4 illustrates an example block diagram of a manipulation component 302 in accordance with an aspect of the innovation. As shown, the manipulation component 302 can include an analysis component 402, a model access component 404 and a control selection component 406. In operation, the analysis component 402 can establish data (or object) relationships and thereafter convey information to the model access component 404 such that an appropriate manipulation model can be retrieved.

Similarly, the analysis component 402 can identify a set or subset of controls which can be used to manipulate the data upon the visual rendering (e.g., dashboard). Here, the control selection component 406 can be used to identify or select a set of controls based upon information provided from the analysis component 402. As described above, the innovation provides for controls to be selected based upon data type, user preference, device context or the like. It will be understood that this functionality alleviates overwhelming the user with unnecessary or undesired controls. In other examples, the control selection component 406 can infer a set of controls based upon a user preference, previous selection, data type or the like.

Figure 5:
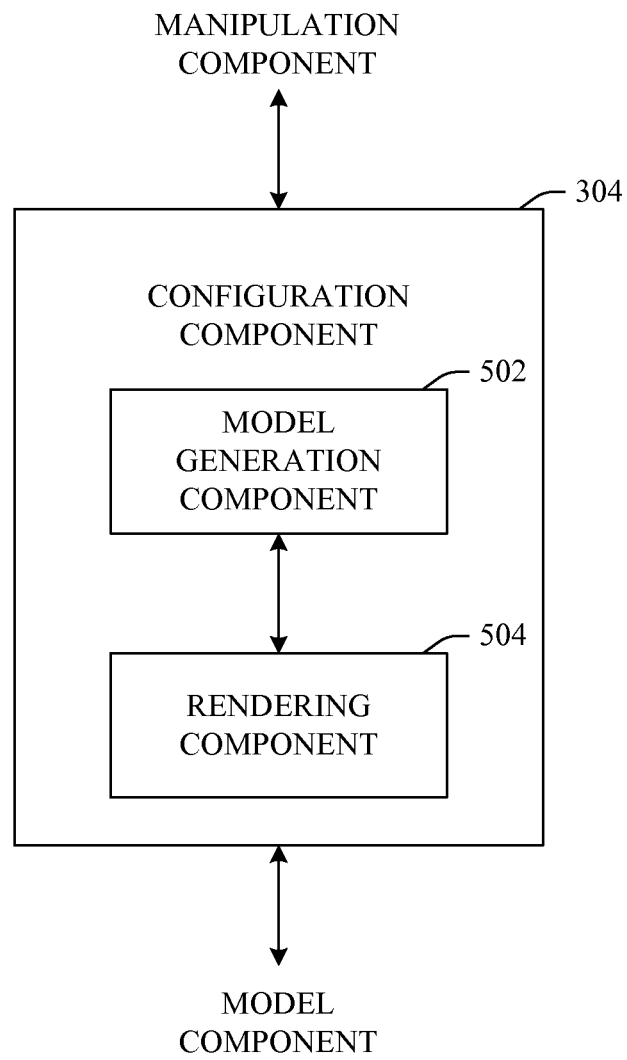
FIG. 5 illustrates an example block diagram of a configuration component in accordance with an aspect of the innovation.

Turning now to FIG. 5, an example block diagram of a configuration component 304 is shown. As illustrated, the configuration component 304 can include a model generation component 502 and a rendering component 504. Features, functions and benefits of these subcomponents will be described below and with reference to the figures that follow.

The model generation component 502 facilitates creation of a data manipulation model (e.g., 106 of FIG. 1). It is to be understood that the model can essentially include 'what if' type rules based upon disparate scenarios. Additionally, the model can define, 'if' a particular object is modified, 'then' modify a defined set of objects based upon defined criteria. These rules and criteria can be manually or automatically selected by (or on behalf of) a user.

The rendering component 504 can facilitate actual rendering of the visual data upon a presentation device. For example, the rendering component 504 can format, organize or generate a layout of the data for presentation upon a device such as a PC, smartphone, cell phone, laptop or the like. Additionally, the rendering component 504 can dynamically update the visual data based upon a change of one or more of the objects upon the display.

Figure 6:
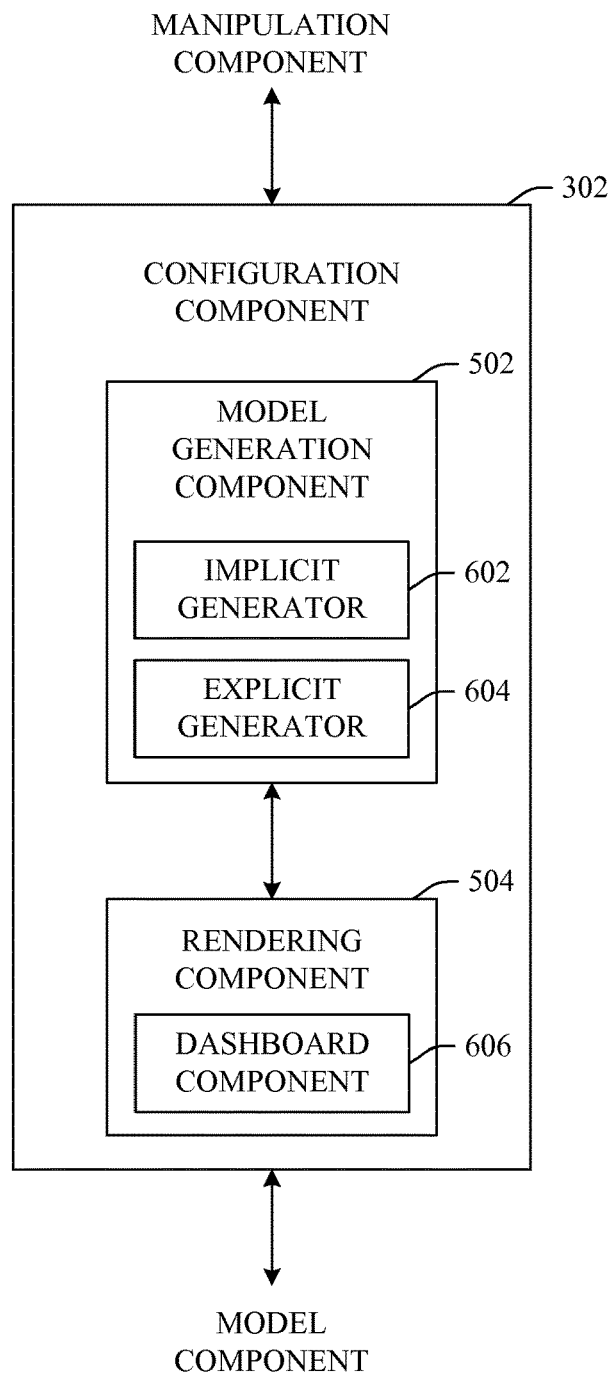
FIG. 6 illustrates an alternative example block diagram of a configuration component in accordance with an aspect of the innovation.

FIG. 6 illustrates yet another alternative example block diagram of a configuration component 302. More particularly, the alternative diagram illustrates that the model generation component 502 can include an implicit generator component 602 and/or an explicit generator component 604. Additionally, as shown, the rendering component 504 can include a dashboard component 606 that facilitates presenting the visual data as well as applicable controls upon a display.

As described above, the model can be automatically (implicitly) or manually (explicitly) generated. For example, based upon the type of data, artificial intelligence (AI) mechanisms can be employed to automatically establish relationships between data objects. On the other hand, a user can manually link or otherwise associate visual objects by generating rules that define the association(s). Based upon these rules, objects can be automatically adjusted or otherwise altered based upon modifications or manipulations to other objects.

The dashboard component 606 can be employed to generate the visual representation of the data as well as to convey relationship information. For instance, by hovering upon an object, the dashboard component 606 can be used to convey relationship information. In other words, hovering atop an object can launch indication of which other visual objects are associated with the hovered upon object. Thus, this indication prompts a user with regard to which objects will be affected by manipulation of an object.

Figure 7:
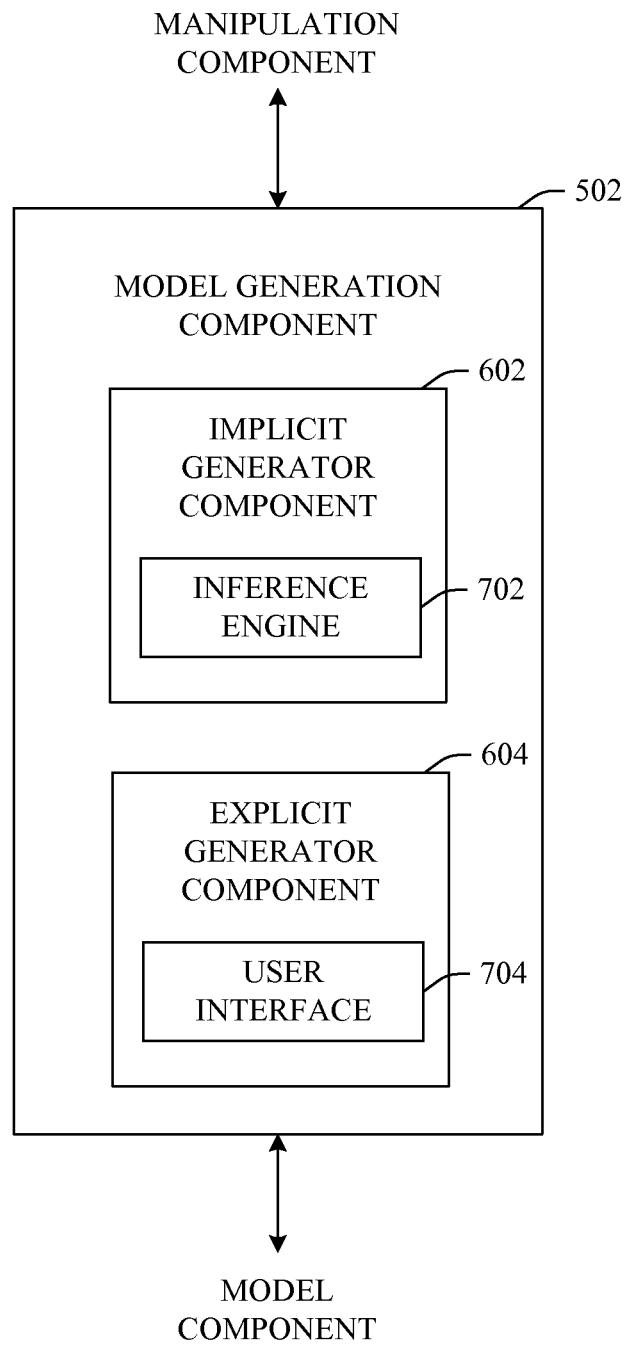
FIG. 7 illustrates an example model generation component in accordance with an aspect of the innovation.

FIG. 7 illustrates an example model generation component 502 wherein the implicit generator component 602 includes an inference engine 702 (e.g., AI) and the explicit generator component 604 includes a user interface 704 which facilities user-generated rules and/or associations. In accordance with the innovation, the model can include an implementation scheme (e.g., rule) which can be applied to define objects to modify as well as to what extent to modify the object(s). It will be appreciated that this rule-based model can be automatically and/or manually defined. In response thereto, the rule-based implementation can select objects included within the rendering or presentation by employing a predefined and/or set of programmed rule(s) based upon any desired criteria (e.g., file type, modification type, device context, user identity).

The inference engine 702 facilitates automating one or more features in accordance with the subject innovation. The subject innovation (e.g., in connection with object selection for modification, tool/control selection for rendering) can employ various AI-based schemes for carrying out various aspects thereof. For example, a process for determining when, if and how an object should be modified can be facilitated via an automatic classifier system and process.

In one aspect, a classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when, if, or how an object should be modified, which tools/controls should be displayed based upon a user identity, device context, data type, etc.

Figure 8:
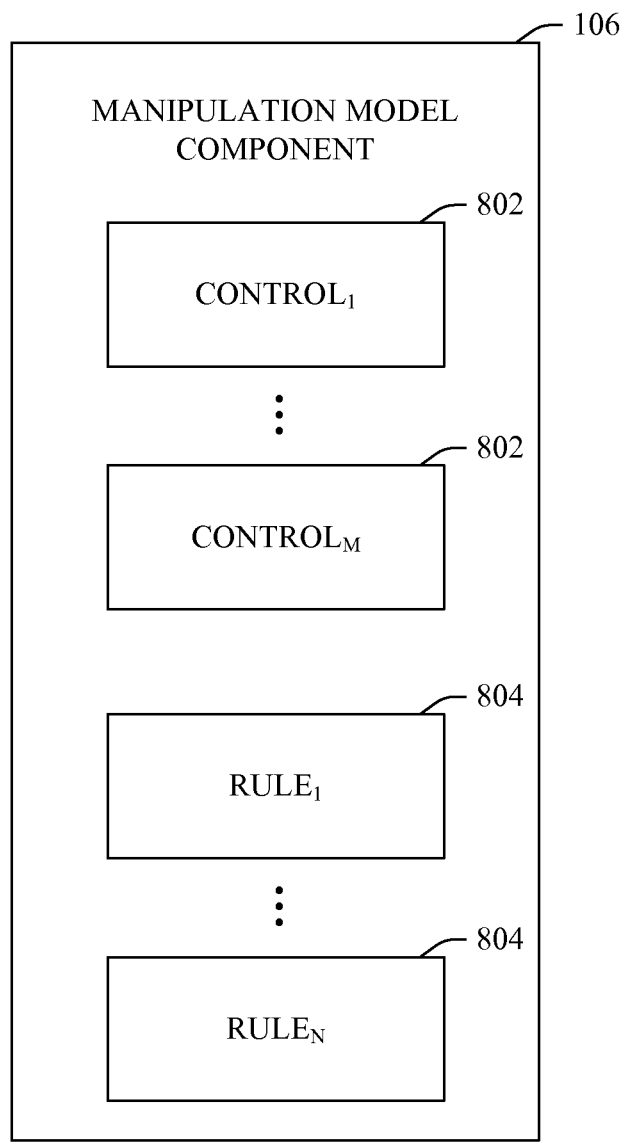
FIG. 8 illustrates an example manipulation model component in accordance with an aspect of the innovation.

An exemplary manipulation model component 106 is shown in FIG. 8. Essentially, the model component 106 can include 1 to M control identifiers 802 as well as 1 to N rules 804, where M and N are integers. As described supra, these control identifiers and rules (802, 804) define associations and relationships with and between visual data objects. In other words, the control identifiers 802 can be linked to a particular data type such that the control is launched in connection with a particular data type. Similarly, controls can be launched based upon user identity, device context or the like as preferred, inferred or otherwise defined/determined.

The rules 804 can define the 'what if' or 'if . . . then' scenarios related to data objects. In other words, in one aspect, the rule can answer the question, "what if this object is changed" (e.g., "what will change if this object is changed?") In another scenario, the rule 804 can define, "if this object is changed, then change . . . " Additionally, the rule 804 can define how to change other objects based upon a change of a selected object. Thus, there are at least two scenarios addressed by the rules 804. First, the rule 804 can notify a user of the extent of impact a modification to an object will have (e.g., pre-modification). Secondly, the rule 804 can react to a change of an object by defining the impact in order to effect modification (e.g., post-modification).

While an example model component 106 is shown in FIG. 8, it is to be understood that the model can be of most any suitable format known in the art. In one example, the model 106 can be a spreadsheet file which interrelates cells of the sheet thereby defining relationships. In other aspects, a database file, metatags, etc. can be employed to interrelate data and objects. These aspects are to be included within the scope of this disclosure and claims appended hereto.

Figure 9:
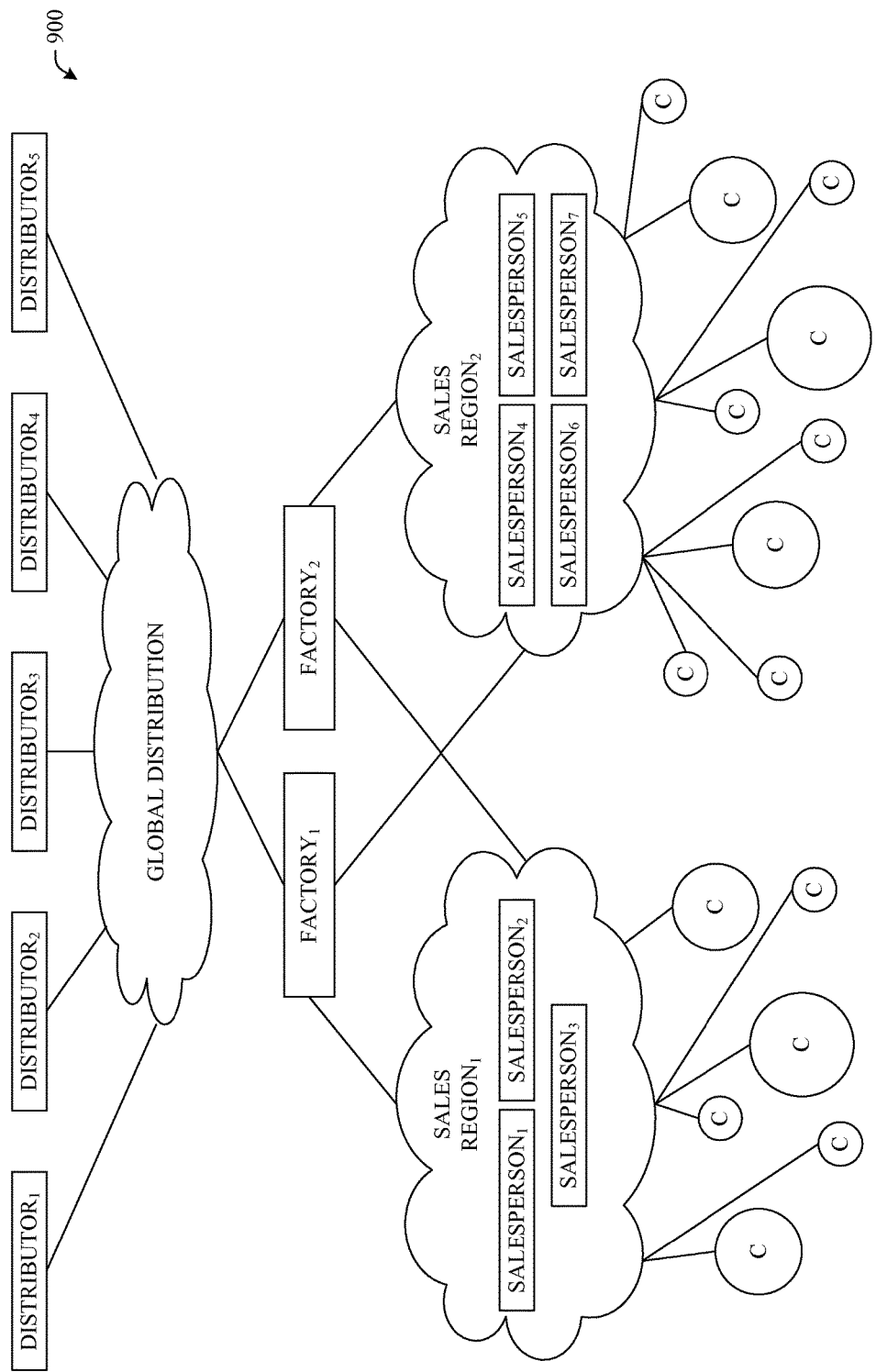
FIG. 9 illustrates an example visual rendering of a global distribution network in accordance with an aspect of the innovation.

FIG. 9 illustrates an example global distribution rendering 900 in accordance with an aspect of the innovation. It is to be understood that this rendering is provided to add perspective to the innovation and not intended to limit the innovation in any manner. Rather, the example is provided to illustrate the interrelation of objects within a visual rendering. Essentially, the rendering illustrates relationships between customers, salespersons, factories, and distributors within a global distribution network.

Figure 10:
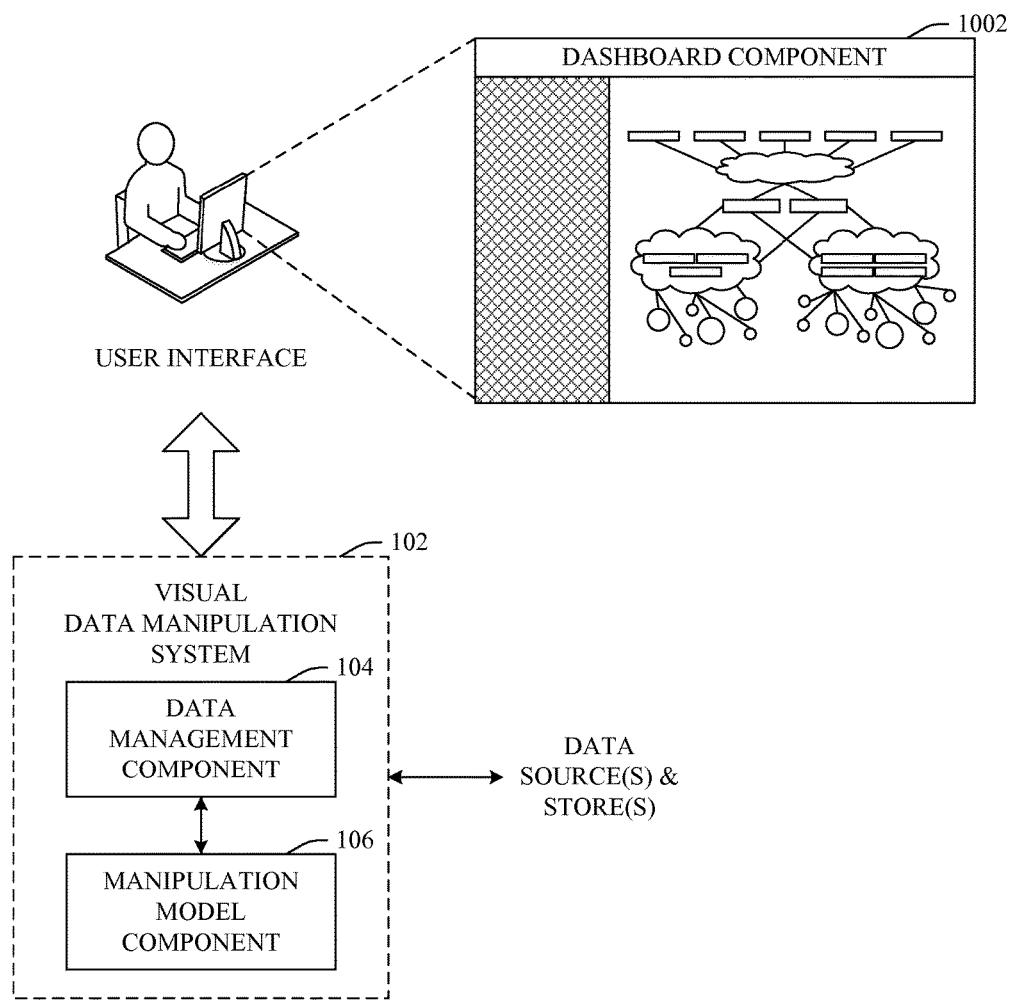
FIG. 10 illustrates an example block diagram of a system that renders a dashboard in accordance with an aspect of the innovation.

In operation, this visual rendering can be provided to a user via a dashboard component (e.g., 1002 of FIG. 10). Essentially, a user can employ a control or tool to modify a visual rendering of the system. Once modified, the visual data manipulation system 102 can be employed to automatically update the visual display (e.g., dashboard). Additionally, as shown, data can be located and accessed from a variety of local and/or remote sources and stores. It is to be understood that these data sources can be defined within or outside of the model 106.

Referring again to FIG. 9, the example visual rendering 900 describes a supply chain that spans the world. Essentially, the supply chain includes manufacturing sites, warehouses/distributors, customers, and salespeople. By modifying the visual rendering 900, the underlying data can be altered thereby modifying other objects within the rendering as appropriate, for example, in accordance with a model.

To illustrate this interrelation, suppose a user merges distributors within the global network. Here, the size, color or other indicator of other objects can be modified to illustrate potential problems (e.g., overload or under-utilization of resources). In another example, addition of more customers in a sales region could trigger a need for additional salespeople to effectively service the demand. In this example, the system can automatically illustrate additional salespeople in the region thereby alerting a user of the potential need to add manpower. Visual cues can be conveyed by way of the dashboard such that a user can be alerted of a scenario or impact by way of a rule or inference.

In another example, hovering above the customer base can indicate that the sales region, number of salespeople and potential location or number of distributors will be affected by a change in customer base. Similarly, a reduction or increase of customer base can affect throughput or output of a factory. In a specific example, if the customer base is drastically reduced, a factory may need to downsize or possibly cease operation entirely, leading to job loss, etc. Essentially, the innovation describes mechanisms by which impact upon elements can be defined through visual manipulation.

Overall, the innovation enables data to be created without actually typing the data itself. Rather, visual manipulation (e.g., defining or changing visual objects, expanding or reducing a region, etc.) can define data. Thus, data can be modified by way of visual modification rather than by explicit typing or entering of data.

Additionally, as described above, the innovation provides a comprehensive means for simulating 'what if' scenarios. In either instance, a data model can be used to drive consequences to tweak and/or illustrate impact of a change of an object. Business rules can be implemented to illustrate or effect a change to an object upon other objects. By monitoring 'what if' scenarios, change can be predicted prior to an actual situation. Thus, reaction can be planned and impact of a change can be expected.

Figure 11:
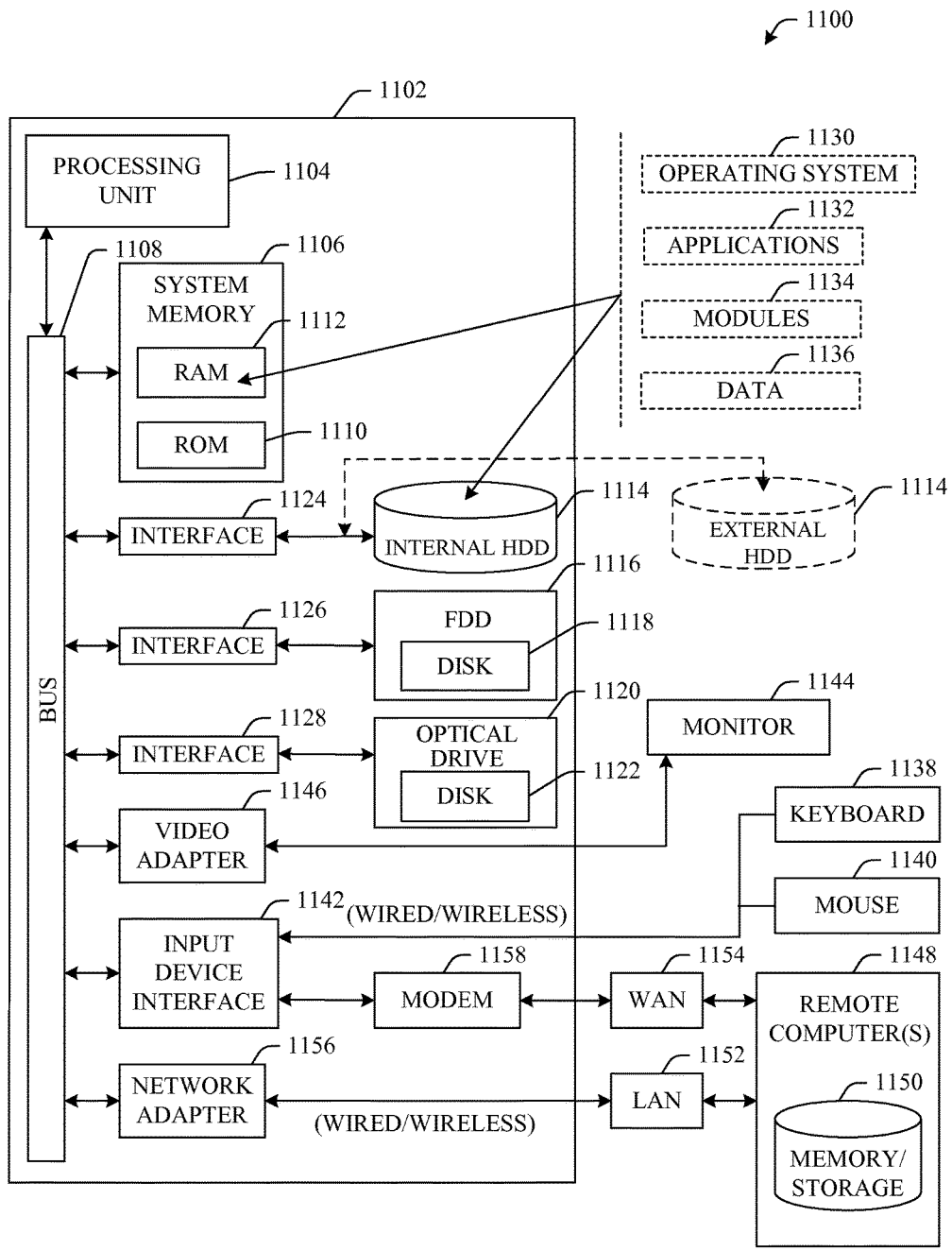
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the subject innovation, FIG. 11 and the following discussion are intended to provide a brief, general description of a suitable computing environment 1100 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the innovation includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the innovation can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g. a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
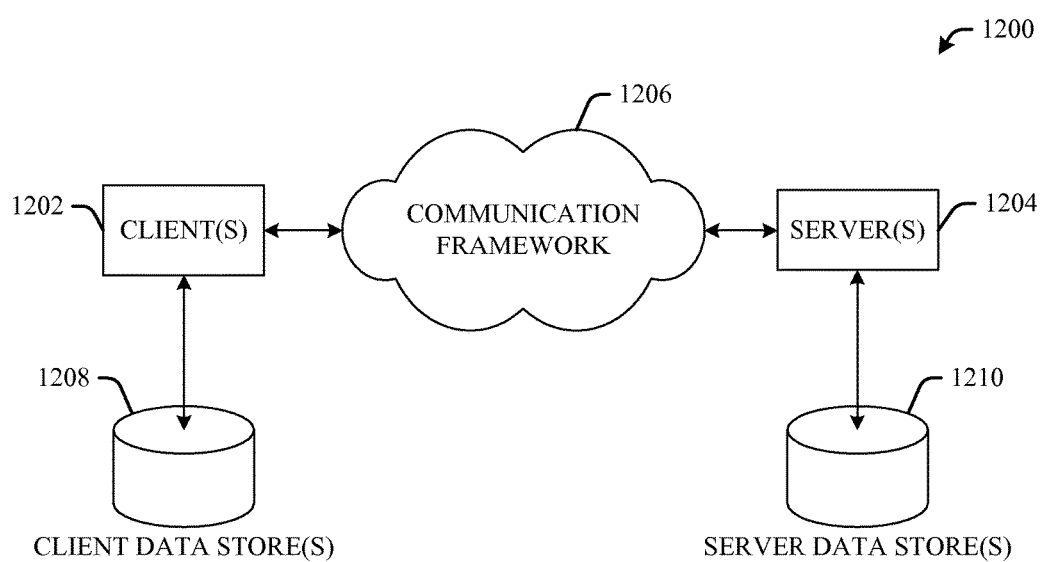
FIG. 12 illustrates a schematic block diagram of an exemplary computing environment in accordance with the subject innovation.

Referring now to FIG. 12, there is illustrated a schematic block diagram of an exemplary computing environment 1200 in accordance with the subject innovation. The system 1200 includes one or more client(s) 1202. The client(s) 1202 can be hardware and/or software (e.g., threads, processes, computing devices). The client(s) 1202 can house cookie(s) and/or associated contextual information by employing the innovation, for example.

The system 1200 also includes one or more server(s) 1204. The server(s) 1204 can also be hardware and/or software (e.g., threads, processes, computing devices). The servers 1204 can house threads to perform transformations by employing the innovation, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:

under control of one or more processors configured with executable instructions:

presenting a dashboard display including multiple objects on a display of a computing device;

modeling data stored in a database or a spreadsheet by the multiple objects using one or more graphical controls in the dashboard, the modeling comprising dynamically adjusting the data stored in the database or the spreadsheet responsive to graphical manipulation of the multiple objects using the one or more graphical controls, the graphical manipulation comprising receiving a selection of an object of the multiple objects without typing of data for the object; and in response to receiving the selection of the object, providing visual indications of which one or more other objects of the multiple objects would be affected in response to a change in the selected object, wherein the visual indications include a change in size and a change in color of the one or more other objects of the multiple objects that would be affected in response to the change in the selected object.

2. The method of claim 1, further comprising determining the one or more other objects of the multiple objects that would be affected in response to the change in the selected object based on relationships between the multiple objects and the selected object in the database or the spreadsheet.

3. The method of claim 1, further comprising prior to changing the selected object, notifying a user of an extent to which the change in the selected object would impact the one or more other objects of the multiple objects after the selected object was changed.

4. The method of claim 1, wherein receiving the selection of the object comprises receiving an indication of hovering a mouse or pointer over the object.

5. The method of claim 1, further comprising providing one or more new controls for graphically manipulating the selected object based on a data type of the selected object.

6. A system comprising:
a processor;
memory communicatively coupled to the processor;
a dashboard component stored in the memory and executable on the processor that is configured to:
  present a dashboard display including multiple objects;
  consolidate one or more graphical controls usable for graphically manipulating the multiple objects based on an identity of a user;
  receive a selection of an object of the multiple objects without typing of data for the object, the selection of the object is received by using the one or more graphical controls; and
  in response to receiving the selection of the selected object in the dashboard display and prior to graphically manipulating the selected object in the dashboard display, visually indicating one or more other objects of the multiple objects in a display that would be affected if the selected object was changed, wherein visually indicating includes a change in size and a change in color of the one or more other objects of the multiple objects that would be affected if the selected object was changed; and
a data management component stored in the memory and executable by the processor that is configured to enable graphically displaying and graphically manipulating data maintained in a database associated with the system via the multiple objects in the dashboard display and dynamically modifying the data maintained in the database in response to graphical manipulation of one or more of the multiple objects in the dashboard display.

7. The system of claim 6, wherein the data management component is further configured to change the one or more other objects based on relationships between the one or more other objects and the selected object in response to changing the selected object.

8. The system of claim 6, further comprising a graphical manipulation component stored in the memory and executable on the processor that selects a set of controls for graphically manipulating the selected object based on an identity of a user.

9. The system of claim 6, further comprising an analysis component stored in the memory and executable on the processor that establishes scopes of change of the one or more other objects in view of a change in the selected object.

10. The system of claim 6, further comprising an inference engine component stored in the memory and executable on the processor that employs a probabilistic analysis and/or a statistical-based analysis to infer an action that a user desires to be automatically performed.

11. The system of claim 6, further comprising a model component that includes a plurality of data relationships between the multiple objects.

12. One or more storage devices configured with computer-executable instructions that, when executed by one or more processors, configure the one or more processors to perform acts comprising:
  modeling data stored in a database or a spreadsheet by multiple objects, the modeling comprising dynamically adjusting the data stored in the database or the spreadsheet responsive to graphical manipulation of the multiple objects;
  presenting a dashboard display including the multiple objects;
  receiving a selection of an object of the multiple objects without typing of data for the object, the selection of the object is received by using one or more graphical controls; and
  in response to receiving the selection of the object and prior to changing the selected object, providing visual indications of one or more other objects of the multiple objects that, if changed, would have an impact on the selected object, wherein the visual indications includes a change in size and a change in color of the one or more other objects of the multiple objects that would be affected if the selected object was changed.

13. The one or more storage devices of claim 12, the acts further comprising determining the one or more other objects of the multiple objects that, if changed, would have the impact on the selected object based on relationships between the multiple objects and the selected object.

14. The one or more storage devices of claim 12, the acts further comprising in response to receiving the selection of the object, visually indicating one or more objects of the multiple objects that would be affected in response to the selected object being changed.

15. The one or more storage devices of claim 14, the acts further comprising prior to changing the selected object, notifying a user of an extent of impact on the one or more objects that a change in the selected object would have.

16. The one or more storage devices of claim 12, wherein receiving the selection of the object comprises receiving an indication of hovering a mouse or pointer over the object.

17. The one or more storage devices of claim 12, the acts further comprising providing one or more controls for graphically manipulating the selected object based on an inference of an action that a user desires to be automatically performed.

* * * * *